Figure 1:
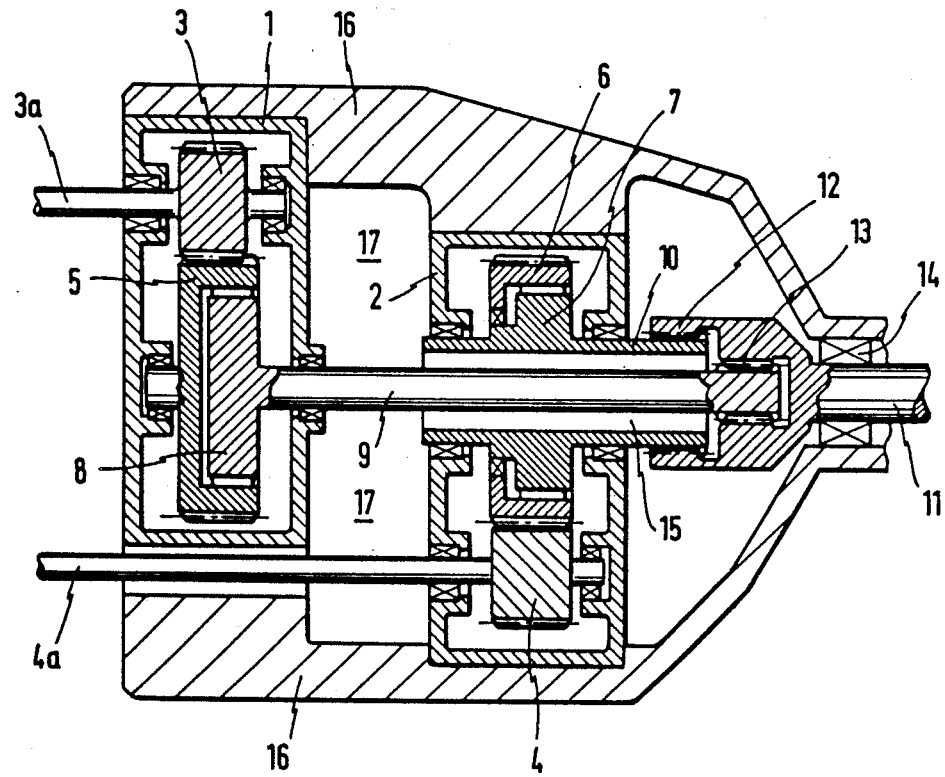

United States Patent [19]

Seefluth

[11] Patent Number: 4,955,561
[45] Date of Patent: Sep. 11, 1990

[54] COGWHEEL DRIVE MECHANISM FOR AIRCRAFT

[75] Inventor: U. C. Seefluth, Dornburg, Fed. Rep. of Germany

[73] Assignee: U. Christian Seefluth, Dornburg, Fed. Rep. of Germany

[21] Appl. No.: 91,273

[22] Filed: Aug. 31, 1987

[30] Foreign Application Priority Data

Sep. 2, 1986 [DE] Fed. Rep. of Germany ....... 3629867

[51] Int. Cl.$^5$ .............................................. B64D 35/08
[52] U.S. Cl. ...................................... 244/60; 416/125; 416/170 R; 74/665 B; 74/665 K
[58] Field of Search ................. 244/60, 69; 74/665 R, 74/665 A, 665 K, 661, 665 B, 606 R; 416/125, 129, 170 R; 248/555, 556, 557

[56] References Cited

U.S. PATENT DOCUMENTS

| | | | |
|---|---|---|---|
| 2,073,976 | 3/1937 | Renaux et al. | 244/550 |
| 2,180,599 | 11/1939 | Menasco | 24/665 B |
| 2,297,400 | 9/1942 | Friedrich | 244/60 |
| 2,518,841 | 8/1950 | Vincent | 416/129 |
| 2,619,797 | 12/1956 | Haworth | 416/170 R |
| 2,734,396 | 2/1956 | Falk et al. | 74/665 B |
| 2,838,913 | 6/1958 | Peterson et al. | 416/170 R |
| 3,121,546 | 2/1964 | Bruyere | 244/60 |
| 3,188,884 | 6/1965 | Bancroft | 244/60 |
| 3,669,230 | 6/1972 | Burkhardt et al. | 74/661 |
| 3,872,675 | 3/1975 | Amiot | 74/661 |
| 4,177,693 | 12/1979 | Ivanko et al. | 74/665 A |
| 4,182,200 | 1/1980 | Steinberg et al. | 74/665 R |
| 4,216,925 | 8/1980 | Mendiberri | 244/60 |
| 4,255,981 | 3/1981 | Sigg | 74/665 A |
| 4,270,408 | 6/1981 | Wagner | 74/661 |
| 4,403,968 | 9/1983 | Heidrich et al. | 74/665 A |
| 4,481,841 | 11/1984 | Abthoff et al. | 74/661 |
| 4,628,583 | 12/1986 | Kronogard | 74/661 |

FOREIGN PATENT DOCUMENTS 334519 9/1917 Fed. Rep. of Germany ...... 416/125

Primary Examiner—Galen Barefoot
Attorney, Agent, or Firm—Max Fogiel

[57] ABSTRACT

A cogwheel drive mechanism for driving at least one aircraft propeller or helicopter rotor through two transmissions, with two axially displaced transmission-connection shafts and at least one output shaft in the form of a propeller shaft or rotor shaft. The object is to ensure that at least one driven section will remain fully functional between one of the transmissions and one propeller or the other during any conceivable type of malfunction. There are two spatially separated individual drive mechanisms, each of which is accommodated in a separated housing that accommodates sections of one or both of the output shafts and each of which has one of the two connecting shafts.

15 Claims, 6 Drawing Sheets

COGWHEEL DRIVE MECHANISM FOR AIRCRAFT

The invention concerns a cogwheel drive mechanism for aircraft to drive at least one aircraft propeller or helicopter rotor through two transmissions with the characteristics recited in the preamble to claim 1.

Driving one propeller shaft or rotor shaft from two separate transmissions through one gear assembly is known in aviation.

The system is intended to maintain half of the thrust of the propeller or rotor when one of the transmissions fails, so that the flight can continue. A comparable design is known in drive mechanisms wherein two transmissions release their output to two separate coaxial propeller shafts and accordingly drive two coaxial propellers or rotors in the same or in opposing senses.

The drawback to these known drive-mechanism designs is that, when specific components are damaged, when for instance the drive-mechanism housing breaks or leaks, lubricant is lost, and common bearings or cogwheels on common driveshafts suffer damage, the two transmission sections, which are integrated into the drive mechanism in terms of function or design through specific components, will fail, and two-engine reliability can no longer actually be ensured.

The object of the present invention is to provide a cogwheel drive mechanism of the type initially described that will ensure that at least one driven section will remain fully functional between one of the transmissions and one propeller or the other during any conceivable type of malfunction.

With a drive mechanism with the characteristics described in the preamble to claim 1 as a point of departure, the object is attained by the characteristics in the body of that claim.

Separating the mechanism in accordance with the invention into two individual drive mechanisms, each with an individual housing structure at least in the vicinity of the output shaft or shafts prevents a malfunction in either drive mechanism from affecting the other. Since a transmission is connected to the intake end of each drive mechanism, the theory behind the invention is not invalidated by the separate housing of the individual drive mechanism associated with each transmission merging somehow into that of the transmission. Damage to the transmission or to the drive mechanism will accordingly always be kept remote from the other intake section. In one preferred embodiment, however, the drive mechanisms are also closed off at the intake end for reasons of design by an in itself closed off individual housing, meaning that the shaft that connects the individual drive mechanisms to their associated transmissions constitutes an entering shaft into the drive-mechanism housing. To allow transmission errors to be disengaged from the rest of the drive mechanism even when they do not require it due to any inherent malfunction, an idling gear is provided at the out-take end of each individual drive mechanism. This measure prevents the rest of the intake section from being forced to drive the damaged intake section as well.

Thus, separating in accordance with space or with design the drive mechanism or drive-mechanism housing into two individual housings accommodating cogwheel or bearing systems will ensure that one drive mechanism will continue functioning perfectly whenever the other is damaged.

In terms of the common driven shaft it is preferable for the individual drive mechanism adjacent to the propeller to have a shaft passage, preferably in the form of a sealed pipe-like shaft tunnel, especially if the output shaft from the drive mechanism next to the propeller is a hollow shaft with the shaft of the second drive mechanism extending, preferably coaxially, through it.

This measure ensures that the functions of not only the two driveshafts but also those of the driven shafts will be completely independent and separate. This can in particular also be attained if the journal bearings of the hollow shaft of the drive mechanism adjacent to the propeller is positioned only outside toward the drive-mechanism housing and not inside toward the penetrating cogwheel shaft of the second individual drive mechanism.

In one preferred embodiment that is especially simple in design, however, both individual drive mechanisms can also have a common driven shaft, preferably over-dimensioned for the sake of stability, whereby at least one force-transmission section will be very reliable in terms of outage when a cogwheel breaks.

Further embodiments of the invention will be evident from the subsidiary claims in conjunction with the examples illustrated in the drawing, which is in particular referred to, and will be specified in the following description.

IN THE DRAWING

Figure 2:
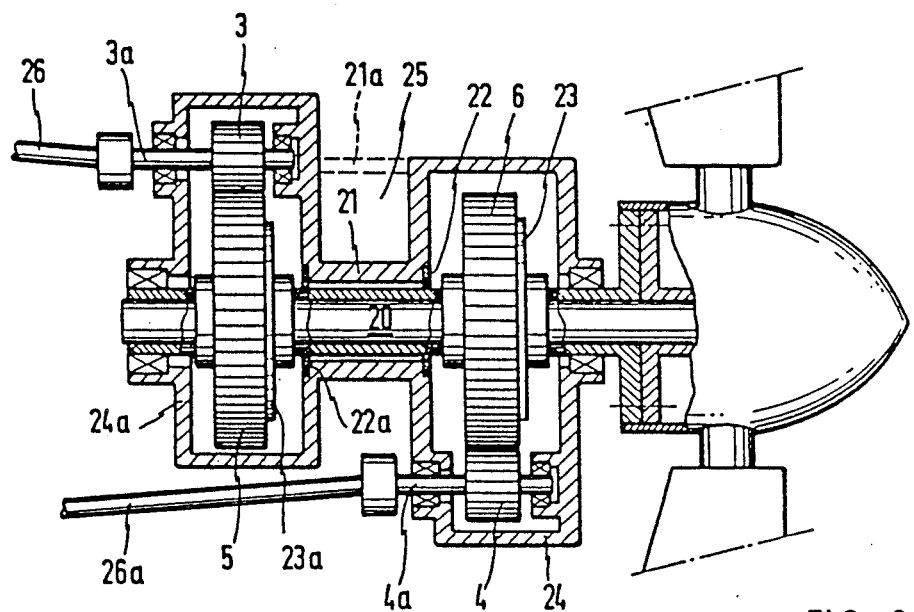
Figure 3:
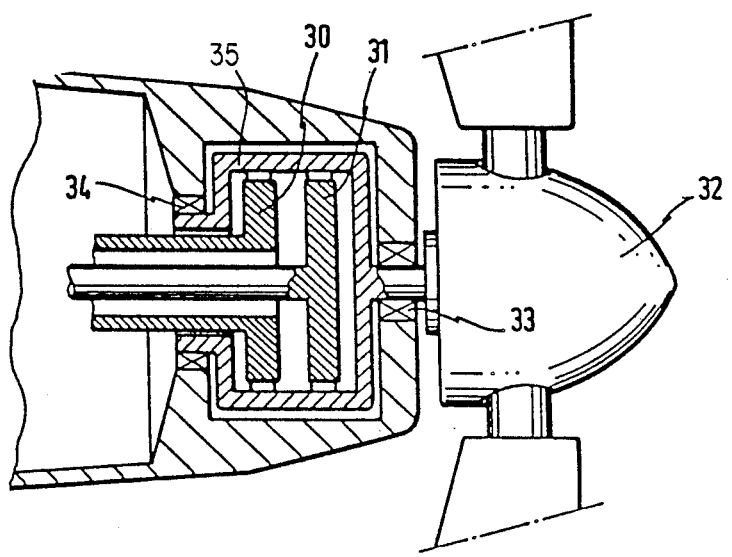
Figure 4:
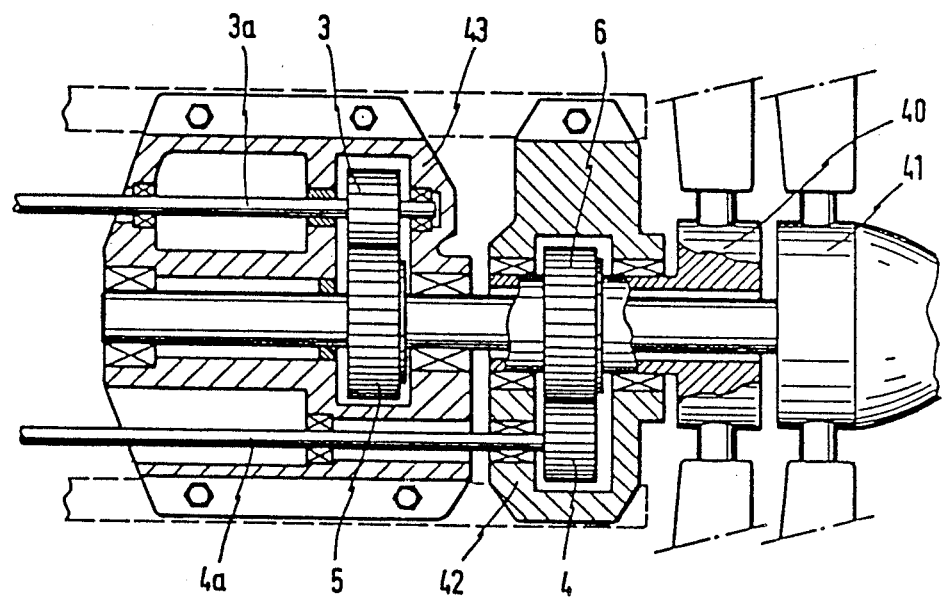
Figure 5:
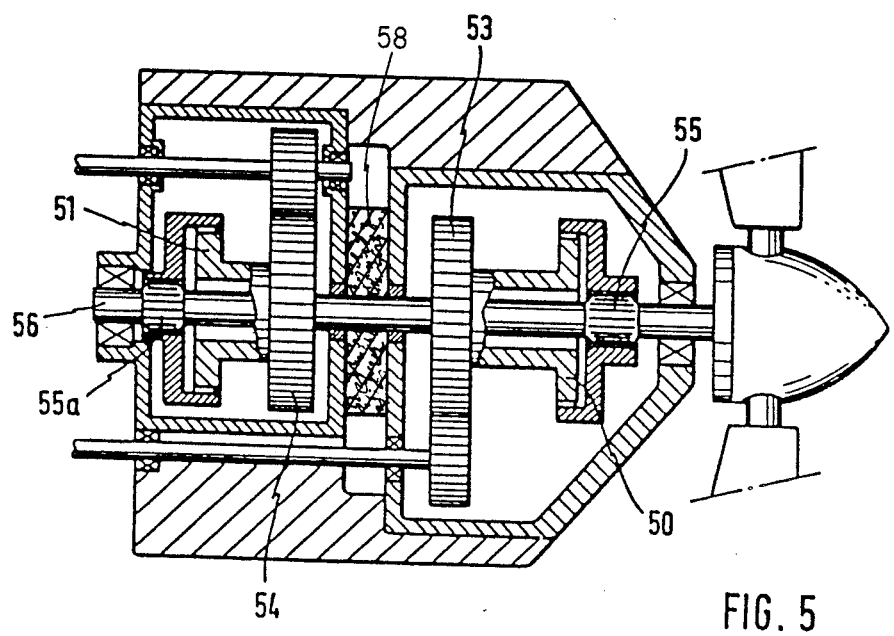
Figure 6:
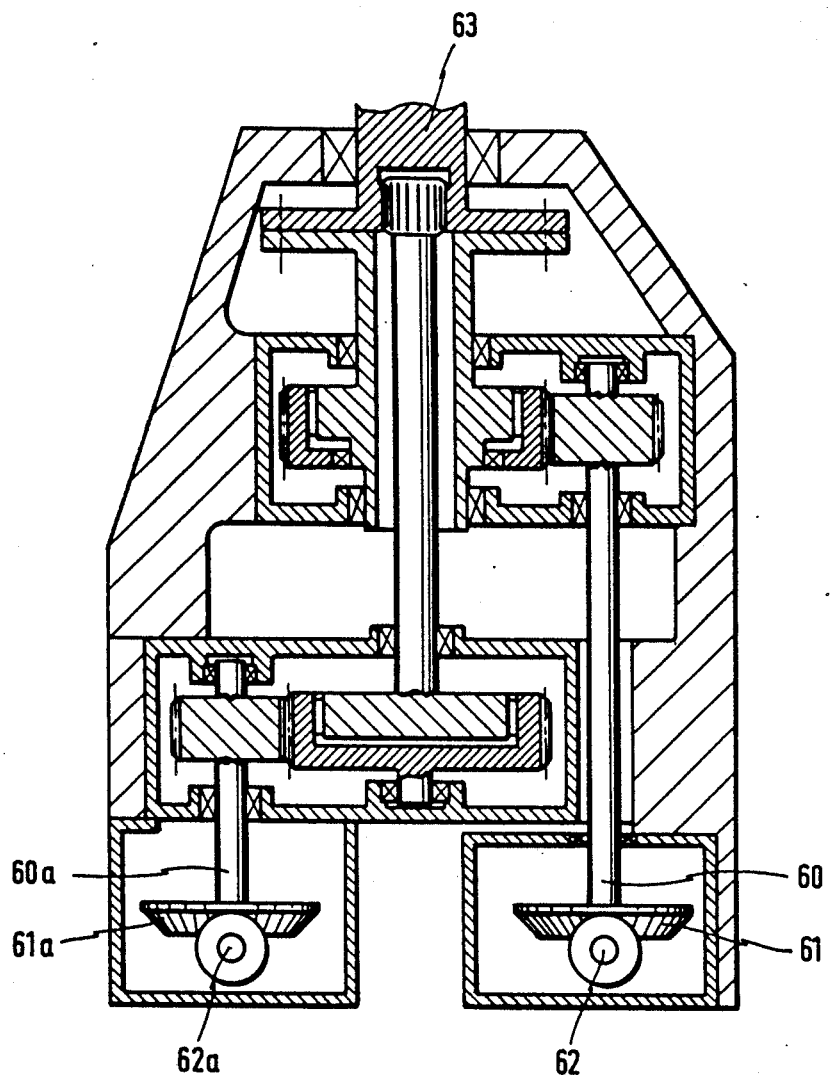
Figure 7:
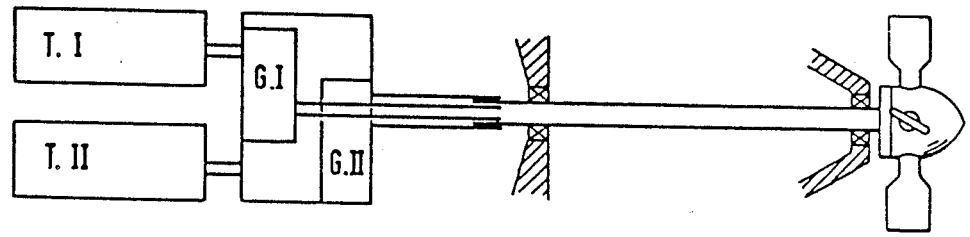
Figure 8:
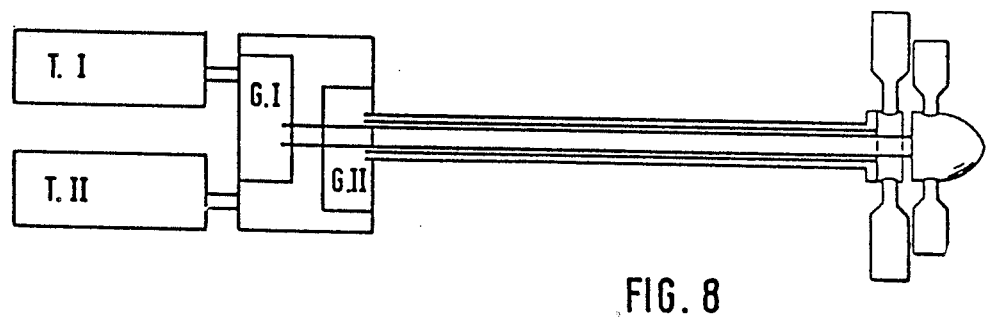

FIG. 1 is a longitudinal section through one embodiment of a drive mechanism with separate coaxial driven shafts, FIG. 2 illustrates another embodiment with the common driven shaft in longitudinal section and some components, like cogwheels and the hub of the propeller viewed from the side, FIG. 3 is mainly a longitudinal section of an embodiment with idling gear directly behind the propeller, FIG. 4 is mainly a longitudinal section of an embodiment intended for driving two coaxial propellers, FIG. 5 illustrates another embodiment with separate idling-gear designs and a common driven shaft, FIG. 6 illustrates the embodiment of a drive mechanism illustrated in FIG. 1 with additional angular gears and intended for driving a helicopter rotor, FIG. 7 is a schematic overall illustration of a drive system wherein force is transmitted to a central propeller from two transmissions, and FIG. 8 is a schematic overall illustration of a drive system wherein force is transmitted to two coaxial and separately rotating propellers from two transmissions.

The drive mechanism schematically illustrated in FIG. 1 consists of two separated individual drive mechanisms surrounded by two likewise separated housings 1 and 2. Each individual drive mechanism has a driving cogwheel 3 or 4 that is connected to a driveshaft 3a or 4a and a driven cogwheel that is connected to a driven shaft. To save weight and space the idling gears 7 and 8 for each individual drive mechanism are accommodated inside the bodies of takeoff-end cogwheels 5 and 6. Cogwheel-and-idling-gear subassembly 5–8 is connected to a central shaft 9 and cogwheel-and-idling gear subassembly 6–8 to a hollow shaft 10.

The two drive-mechanism driven shafts 9 and 10 are combined into a shaft subassembly by means of denture clutches 12 and 13 only at a propeller shaft 11. The denture clutches are preferably slightly crowned and hence slightly articulated in order to compensate for errors in alignment between the driven shafts and the propeller shaft, during a bearing malfunction for example. Propeller shaft 11 has its own bearing 14, which can be expanded by further bearing subassemblies (not illustrated) toward the propeller.

The design described with reference to FIG. 1 represents the basic principle behind the invention, with two individual drive mechanisms combined into one subassembly and designed such that the individual drive mechanism adjacent to the propeller or rotor has an open shaft passage 15, which the output shaft 9 of the other individual drive mechanism extends through. The open shaft passage is accordingly in the form of a pipe-like shaft tunnel.

This measure ensures that, when any component of the drive mechanism fails (when a housing breaks, accompanied by loss of lubricant, when a cogwheel breaks, when a bearing is damaged, or when a shaft breaks), the other individual drive mechanism will not be affected by the malfunction and will remain completely functional.

To prevent propeller rotation from being impeded during drive-mechanism malfunction, each idling gear 7 and 8 is positioned between the most downstream cogwheel 5 or 6 and the particular driven shaft 9 or 10, which can also alternatively be replaced by automatic clutches. If it is also desirable to ensure against the hardly conceivable malfunction of an idling gear not opening, another idling gear or clutch can be positioned between each driveshaft 3a and 4a and the transmission connected to it.

The two individual drive mechanisms in this embodiment are combined into one assembly on a framework base 16, which propeller shaft 11 is also mounted on. The two drive mechanisms can alternatively be connected by other structures like flanges or intermediate housings. The space 17 between the two drive-mechanism housings 1 and 2, which can also be narrower or smaller than illustrated, ensures that the other drive-mechanism subassembly will not suffer when one housing breaks. The space can also be partly or completely packed with an impact-absorbing material 58, especially one with a resilient or plastic consistency, to protect the walls of the housing.

The overall design of the embodiment in FIG. 1 allows the total weight to be reduced in that the two individual drive-mechanism housings 1 and 2 are composed of two deep-drawn sheet-metal halves. The plane of separation preferably extends radially in relation to the driven shaft.

The design illustrated in FIG. 2 is even simpler in that the individual drive mechanisms have a common driven shaft 20. To allow separate lubrication systems the shaft is doubly sealed at sealing points 22 and 22a on connecting housing 21 to prevent lubricant from escaping.

The idling gears 23 and 23a in this embodiment are also inside the cogwheels. The housings 24 and 24a for the individual drive mechanisms are in this case rigidly connected by an intermediate housing 21a or 21 that has a hollow space 25 or constriction. Intermediate flanges or a common framework base can alternately be provided at the connecting point.

Driveshafts 26 and 26a, which are slightly angled due to a cardan joint can also be employed in the other embodiments. The cogwheels can alternatively be slightly spherical (not illustrated) to allow the driveshafts to be angled and adjust to particular transmission positions.

FIG. 3 illustrates an embodiment of the invention wherein idling gears 30 and 31 are positioned between propeller 32 and the drive mechanism and accordingly outside the drive-mechanism housing. This design leaves only the propeller shaft downstream of the idling gears, further increasing reliability. The double propeller mount 33 and 34 is also integrated into the idling-gear housing to save weight. Furthermore, the idling gears, which are usually not subject to significant wear, do not necessarily have to be replaced along with the drive mechanism.

FIG. 4 illustrates a drive-mechanism embodiment wherein a separate propeller 40 and 41 is driven by each transmission. The individual drive-mechanism housings 42 and 43 are separated in this embodiment as well, and the cogwheel systems functionally independent of one another in all components. The propellers in this embodiment can be driven in the same or in opposing senses. Alternatively, the distance between the propellers and the drive mechanism can be increased to allow an additional mount for the propeller shafts. The function and design of the drive mechanism are comparable to those illustrated in FIG. 1.

The only difference between the embodiments illustrated in FIG. 2 and FIG. 5 is that the idling gears 50 and 51 in the latter are separate from cogwheels 53 and 54 and are connected to driven shaft 56 by denture clutches 55 and 55a respectively. This measure allows the idling gears to have a longer radius and accordingly to be thinner and weigh less.

FIG. 6 shows an alternative version of the embodiment illustrated in FIG. 1 and intended for helicopters. This embodiment has beveled-wheel angular gears 61 and 61a upstream of driveshafts 60 and 60a, which can accordingly be connected at a right angle to shafts 62 and 62a in order to establish a connection to the transmissions.

The vertical mast 63 for the helicopter rotor can additionally be mounted above the drive mechanism. The function and design of this drive mechanism are otherwise comparable to those of the embodiment illustrated in FIG. 1 and provide two-engine security for helicopters and a drive-mechanism system wherein any component can fail without involving the other power-transmission section.

FIGS. 7 and 8 are schematic illustrations of a system for driving one and two propellers respectively. The design is specifically intended for an airplane with a single-axis rear-thrust drive mechanism, wherein the propellers are located fairly remote from the drive mechanism and at the rear of the airplane. The shafts can alternately be equipped in a known way with articulations behind the drive mechanisms and upstream of each propeller in order to compensate for imprecise shaft alignment.

The particular advantages of the instant invention are that, in airplanes that have two transmissions, and there can basically also be more, and that operate with one propeller or even two separately rotating propellers along one thrust or traction axis, any moving and non-moving component of the drive mechanism can fail without involving the other driving section. Two-engined airplanes with central thrust propellers or tractors along the longitudinal axis will, along with their drive mechanisms, be ensured against failure during flight to an extent previously unobtainable.

Figure 9:
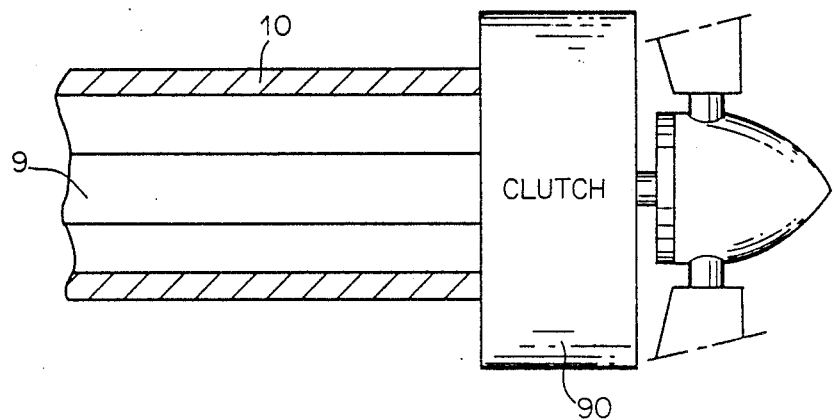

FIG. 9 shows an embodiment in which a clutch 90 connects the central shaft 9 with the hollow shaft rigidly in the vicinity of the propeller.

The shafts 9 and 10, for example, have dynamically independent mounts or bearings with a separating space 15 between them, so that each bearing is independent of the dynamics of the other bearings.

A most downstream propeller-end gear with a rim 35 is provided in FIG. 3. The idling gears 30, 31 are located in vicinity of the respective driven shaft between the rim 35 and the propeller. The idling gears 30, 31 are also located within the interior of the end gear with rim 35.

I claim:

1. A gear drive arrangement for driving one aircraft propeller or helicopter rotor comprising: two transmissions with two laterally displaced drive shafts and at least one driven shaft connected to a propeller shaft or rotor shaft; said two transmissions comprising two spatially separated individual drive mechanisms; a separate housing for each of said drive mechanisms and housing sections of said driven shaft; each of said drive mechanisms having one of said two drive shafts so that the propeller or rotor is assuredly always driven by one of said drive shafts, all said shafts having longitudinal axes, said two driven shafts and said propeller or rotor shaft being arranged one behind the other in predetermined sequence along said longitudinal axes.

2. A drive arrangement as defined in claim 1, wherein each housing is separately sealed for preventing loss of lubricant.

3. A drive arrangement as defined in claim 1, including an idling gear in each individual drive mechanism for preventing rotation in one direction.

4. A drive arrangement as defined in claim 1, wherein said individual drive mechanisms are adjacent to a propeller, one drive mechanism having a hollow driven shaft, and the other drive mechanism having a driven shaft extending coaxially through said hollow shaft.

5. A drive arrangement as defined in claim 1, wherein said housings are separated by a substantially narrow space, each housing having a wall bordering said space and facing the other drive mechanism, said two drive mechanisms having their own separate housing wall facing all directions.

6. A drive arrangement as defined in claim 1, including connecting elements for connecting said separate two housings, said connecting elements being removable.

7. A drive arrangement as defined in claim 1, wherein said housings have walls facing each other and separated from one another; and impact-absorbing material between said facing housing walls.

8. A drive arrangement as defined in claim 4, wherein said hollow driven shaft and said coaxial driven shaft of said other drive mechanism are each secured to a propeller shaft by separate fastening means.

9. A drive arrangement as defined in claim 1, wherein each said housing comprises a sealed subassembly comprised of a single piece of material of a casting; and a housing wall joining said two separate housings.

10. A drive arrangement as defined in claim 4, including two separately rotating axially displaced propellers driven by said coaxial driven shafts, each driven shaft driving one of said two propellers.

11. A drive arrangement as defined in claim 4, wherein said hollow driven shaft has journal bearings in the individual drive mechanism adjacent to the propeller and positioned only outside and toward the respective housing.

12. A drive arrangement as defined in claim 1, wherein said housing comprises two deep-drawn metal halves, said halves being separated by a plane extending at right-angle to the driven shaft.

13. A drive arrangement as defined in claim 1, wherein each said separate housing also encloses the respective drive mechanism accommodated by the housing, each of said drive shafts extending as an entering shaft through a wall of the housing.

14. A drive arrangement as defined in claim 1, including a torque-transmitting linkage between one driven shaft and propeller shaft and having individually and spatially separate rotating parts independent of another torque-transmitting means.

15. A driven arrangement as defined in claim 4, including bearings for supporting each of said coaxial driven shafts with a space between said bearings, each bearing being independent of dynamic actions of the other bearings.

* * * * *